United States Patent [19]
Ueda

[11] Patent Number: 6,009,331
[45] Date of Patent: Dec. 28, 1999

[54] COMMUNICATION SYSTEM HAVING MEANS FOR ENABLING CHANNEL ASSIGNMENT TO CALLING TERMINAL ACCORDING TO PRIORITY

[75] Inventor: Hitoshi Ueda, Tokyo, Japan

[73] Assignee: NEC Corporation, Tokyo, Japan

[21] Appl. No.: 08/829,727

[22] Filed: Mar. 31, 1997

[30] Foreign Application Priority Data

Mar. 29, 1996 [JP] Japan ................................ 8-075750

[51] Int. Cl.$^6$ ...................................................... H04B 7/00
[52] U.S. Cl. ........................ 455/450; 455/452; 455/509; 455/512
[58] Field of Search .................................. 455/450, 451, 455/452, 454, 426, 509, 512, 513, 514, 560, 453, FOR 104, FOR 105

[56] References Cited

U.S. PATENT DOCUMENTS

| | | | |
|---|---|---|---|
| 5,047,762 | 9/1991 | Bruckert | 455/513 |
| 5,396,649 | 3/1995 | Hamabe | 455/513 |
| 5,442,807 | 8/1995 | Takayama | 455/453 |
| 5,537,684 | 7/1996 | Cassidy et al. | 455/512 |
| 5,574,977 | 11/1996 | Joseph et al. | 455/512 |
| 5,634,197 | 5/1997 | Paavonen | 455/512 |
| 5,722,078 | 2/1998 | Przelomiec et al. | 455/452 |
| 5,745,853 | 4/1998 | Hippelainen | 455/450 |

*Primary Examiner*—Nguyen Vo
*Assistant Examiner*—Duc Nguyen
*Attorney, Agent, or Firm*—Sughrue, Mion, Zinn, Macpeak & Seas, PLLC

[57] ABSTRACT

In assignment of radio channels to terminals for communication with a switching office, one of currently idle channels can be assigned to a calling terminal by use of a channel state memory in the office which memory stores channel numbers and terminal information currently using channels. The office further includes a terminal memory for storing the maximum number separately predetermined for each of fixed and mobile types of the terminals assignable to the channels. The calling terminal is rejected to be assigned with any idle channel when the maximum number is equal to the current number of terminals currently using channels which are same as the type of the calling terminal. In another aspect, the terminal memory further stores information that the fixed type has a priority. An idle channel is assigned to a calling one of fixed type terminals even when the maximum number for the fixed type is equal to or smaller than the current number. In other aspect, the channel state memory stores receiving signal strengths at terminals currently using the channels. When a calling is originated from one of fixed type terminals and when all of the channels are currently used, one of the mobile terminals using a specific channel at the lowest one of the receiving signal strengths is forced to release the specific channel, which channel is in turn assigned to the calling fixed type terminal.

8 Claims, 12 Drawing Sheets

| CHANNEL NO. | USING STATE | RECEIVING SIGNAL STRENGTH |
|---|---|---|
| 211 | FIXED TERMINAL 1F1 | 10 (dB) |
| 212 | MOBILE TERMINAL 41 | 12 |
| 213 | MOBILE TERMINAL 43 | 10 |
| 214 | FIXED TERMINAL 1F2 | 8 |
| 215 | MOBILE TERMINAL 47 | 4 |
| 216 | IDLE | |
| 217 | FIXED TERMINAL 1F3 | 10 |

12 CHANNEL STATE MEMORY

COMMUNICATION SYSTEM HAVING MEANS FOR ENABLING CHANNEL ASSIGNMENT TO CALLING TERMINAL ACCORDING TO PRIORITY

BACKGROUND OF THE INVENTION

This invention relates to a radio communication system comprises a switching office and a service area including therein stationary or fixed terminals and mobile terminals selectively communicating with the switching office through a plurality of radio channels, and in particular, to a channel assignment to a calling terminal in such a communication system.

In a known communication system of the type as described above, the switching office has a channel state memory having a table. The table comprises a channel number column having plurality of channel numbers, a channel state column representing using state of those channels, and a channel use column representing use of those channels. In more detail, in the channel state column, there is stored information whether those channels are currently idle or not, what terminal currently uses each of the channels and whether or not those channels are freely accessible by any one of terminals. The content in the column can be renewed. In the channel use column, there is previously stored that those channels are previously assigned to terminals, respectively. Usually, several, for example, three channels are previously assigned to three fixed terminals, while other channels are commonly and selectively used by mobile terminals.

The communication system has a control channel in addition to the radio channels for communication. The control channel is used for broadcasting the content in the channel state memory to all of the terminals. Therefore, the control channel is used for broadcasting assignment of one of common channels to a calling one of mobile terminals.

In the known communication system, since the fixed terminals are previously assigned with channels, it is impossible to freely increase the number of fixed terminals within the service area.

On the other hand, any one of the mobile terminals cannot use an idle one of the channels previously assigned to the fixed terminals. This is disadvantageous in the view point of the channel use efficiency.

SUMMARY OF THE INVENTION

Therefore, it is an object of this invention to provide a communication system wherein channels can freely be assigned to any one of fixed and mobile terminals if the channels are idle.

It is another object of this invention to provide a communication system wherein terminals are classified into a priority type and a non-priority type, an idle channel can freely be assigned to a calling terminal of the priority type, and an idle channel can be assigned to a calling terminal of the non-priority type, if a number of non-priority type terminals which are currently using the channels is smaller than a limited number.

It is a further object of this invention to provide a communication system wherein terminals are classified into a priority type and a non-priority type, and a channel which is currently used by one of terminals of the non-priority type is selected to be forcedly assigned to a calling terminal of the priority type.

This invention is applicable to a communication system comprising a switching office and a service area including therein terminals of a fixed and a mobile type selectively communicating with the switching office through a plurality of radio channels. According to this invention, each of the terminals has means for producing a call setup request including its own terminal information to send out, as a particular terminal, the call setup request to the switching office. The switching office comprises channel state memory means for storing whether the radio channels are currently idle or busy and which ones of the fixed and mobile terminals currently use the busy channels; and channel assigning means responsive to the call setup request for looking the channel state memory means to assign one of the idle channels to the particular terminal, while renewing the channel state memory means.

According to an aspect, the terminal information includes type information representing, as a particular type, the particular terminal itself, and the switching office further comprises terminal data memory means for storing the maximum number separately predetermined for each of the fixed and mobile types of the terminals assignable to the plurality of radio channels. The channel assigning means looks the terminal data memory means and the channel state memory means to compare the maximum number of the type corresponding to the particular type with the current number of terminals of the type corresponding to the particular type currently using the busy channels. The channel assigning means assigns one of current idle channels to the particular terminal when the maximum number is larger than the current number.

In another aspect, the terminal data memory means further stores priority information that a predetermined one of the fixed type and the mobile type is a priority type while the other being a non-priority type, and the channel assigning means assigns one of the current idle channels to the particular terminal when the particular type is the priority type, even when the current number is equal to or larger than the maximum number.

In a further aspect of this invention, the channel state memory means may further store receiving signal strengths at terminals using the busy channels. The channel assigning means is responsive to the call setup request including the priority type as the particular type when the all channels are currently busy, for looking the channel state memory means to find out, as a specific terminal, one of terminals of the non-priority type currently using, as a specific channel, one of channels with the lowest one of the receiving signal strengths. The channel assigning means instructs the specific terminal to release the specific channel and assigns the specific channel to the particular channel after the specific terminal completes the release of the specific channel.

This invention further provides a communication system comprising a switching office and a service area including therein terminals of a fixed and a mobile type selectively communicating with the switching office through a plurality of radio channels, wherein each of the terminals comprises: receiving means for receiving a system information broadcast from the switching office through a radio control channel, the system information comprising channel state information whether the radio channels are currently idle or busy and which ones of the fixed and mobile terminals currently use the busy channels; and calling means for referring to the channel state information to select, as a particular channel, one of the idle channels, the calling means producing a call setup request including its own terminal information together with the particular channel to send out, as a particular terminal, the call setup request to the switching office. The switching office comprises channel state memory means for storing the channel state information; broadcasting means for broadcasting the system information through the radio control channel; and channel assigning means responsive to the call setup request for assigning the particular channel to the particular terminal to renew the channel state memory means.

In another aspect, the system information may further comprise terminal data of the maximum number separately predetermined for each of the fixed and mobile types of the terminals assignable to the plurality of radio channels. The calling means refers to the terminal data and the channel state information to compare the maximum number of the type corresponding to its own terminal type as a particular type with the current number of terminals of the type corresponding to the particular type currently using the busy channels. The calling means selects, as the particular channel, one of current idle channels when the maximum number is larger than the current number. The switching office further comprises terminal data memory means for storing the terminal data.

In other aspect, the terminal data may further comprise priority data that a predetermined one of the fixed type and the mobile type is a priority type while the other being a non-priority type. The calling means selects, as the particular channel, one of the current idle channels when the particular type is the priority type, even when the current number is equal to or larger than the maximum number.

In a further aspect, the channel state information may further comprise receiving signal strengths at terminals using the busy channels. The calling means is responsive to the priority type of the particular type when the all channels are currently busy, and refers to the channel state information to find out, as a specific terminal, one of terminals of the non-priority type currently using, as a specific channel, one of channels with the lowest one of the receiving signal strengths. The calling means selects the specific channel as the particular channel. The channel assigning means is responsive to the call setup request to instruct the specific terminal to release the particular channel, and assigns the particular channel to the particular channel after the specific terminal completes the release of the particular channel.

DESCRIPTION OF PREFERRED EMBODIMENTS

Prior to description of preferred embodiments, a known system will be described for supporting the better understanding of this invention with reference to FIG. 1.

Figure 1:
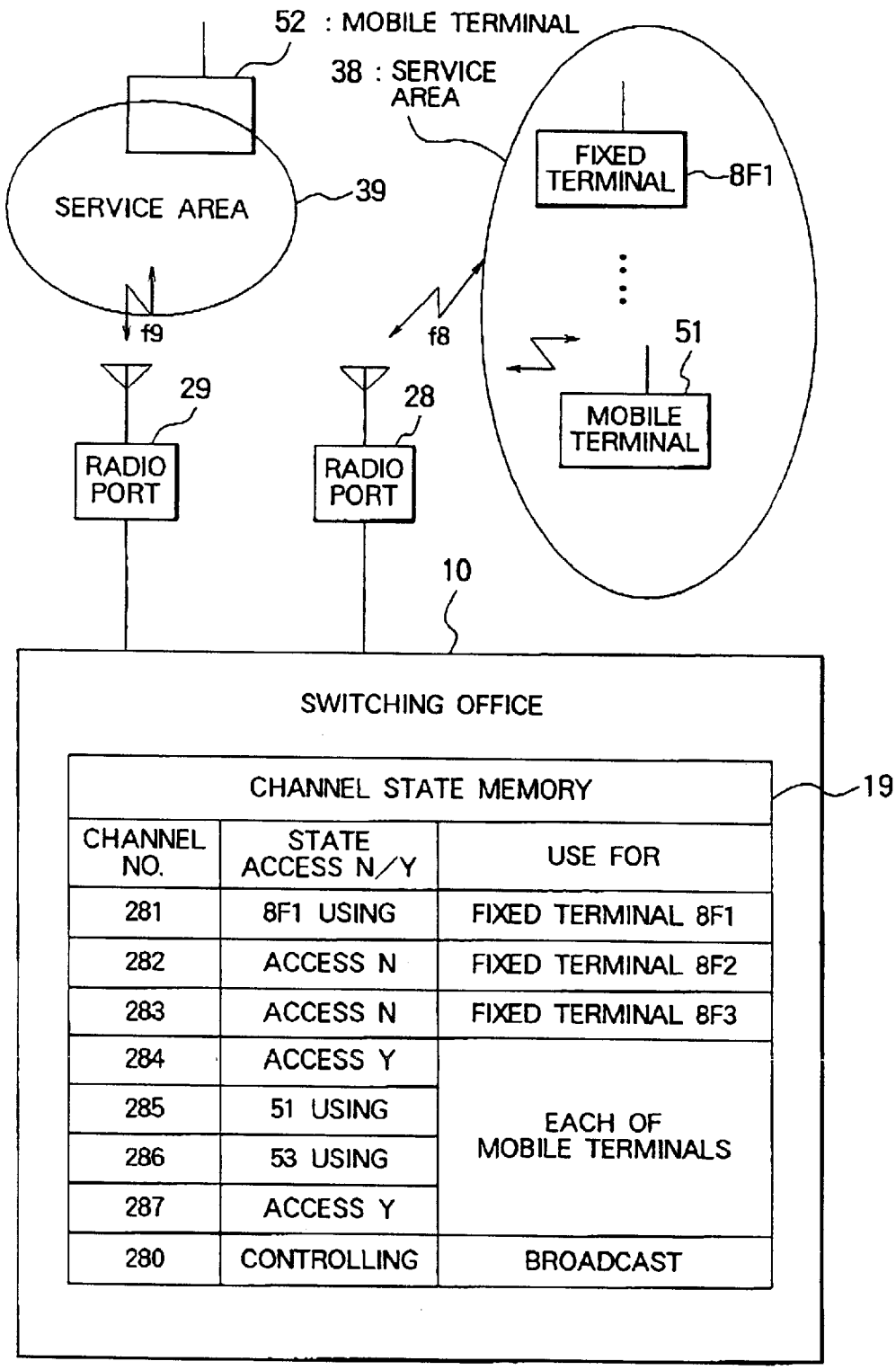
FIG. 1 is a schematic block diagram of a known communication system.

Referring to FIG. 1, the known radio communication system shown therein comprises an switching office 10, a plurality of radio ports (two ports 28 and 29 being shown) connected to the switching office 10 and having service areas 38 and 39, respectively, and a plurality of stationary or fixed terminals (one of which is shown at 8F1) and a plurality of mobile terminals (two of which are shown at 51 and 52) in each of the service areas 38 and 39. The fixed terminals 8F1 and mobile terminals 51 and 52 will be collectively referred to as radio terminals.

Each of radio ports 28 and 29 is for repeating between the switching office 10 and each of terminals in the corresponding service area. Different frequencies f8 and f9 are assigned for radio communication between the radio port 28 and radio terminals in the corresponding service area 38 and between the radio port 29 and radio terminals in the corresponding service area 39, respectively. A radio signal of each of frequencies f8 and f9 includes a plurality of channels which are separately used for communication of the radio port 28 or 29 with terminals in the corresponding service area 38 or 39.

The switching office 10 is provided with channel state memories corresponding to the radio ports 28 and 29 for storing states of the channels on the frequencies f8 and f9 for the radio ports, respectively.

In the figure, the channel state memory 19 is only shown as one for the channels 281–287 and 280 on the frequency f8 for the radio port 28, for the simplicity of the drawings and description.

The channel state memory 19 stores a table comprising a channel number (CHANNEL NO.) column, a channel state and accessibility (STATE, ACCESS N/Y) column, and a predetermined channel use (USE FOR) column. In the present example, channels 281, 282, and 283 are shown to be used for fixed terminals 8F1, 8F2, and 8F3, respectively, and are all non-accessible (ACCESS N). Channel 281 is currently used by fixed terminal 8F1. Channels 284–287 are accessible by each one of mobile terminals in the service area. Channels 285 and 286 are shown currently used by mobile terminals 51 and 53. Channel 280 is a control channel (CONTROLLING) for broadcasting channel state and assigning information to each of the fixed and mobile terminals in the service area.

Channel memories for other radio ports also store similar tables.

Now, description are made as regards operation of start of communication of the switching office 10 with fixed terminal 8F1 and mobile terminal 51.

From the broadcast through the control channel 280, the fixed terminal 8F1 determines that the channel 281 is currently idle and not accessible but is assigned to the fixed terminal 8F1 itself. Then, the fixed terminal 8F1 transmits a call setup request through the idle channel 281. The call setup request is passed through the radio port 28 to the switching office 10. Since the channel 281 is assigned to the fixed terminal 8F1 although non-accessible, the switching office 10 sends out call setup confirmation to the fixed terminal 8F1 through the radio port 28 and through the channel 281 to start the communication requested. Then, the switching office 10 renews the channel state memory 19 so that the current state of channel 281 becomes "busy" or "8F1 using", as shown in the figure.

The mobile terminal 51 determines an idle one, for example, 285 of accessible channels 284–287 from the broadcast on the control channel 280, and transmits a call setup request through the channel 285. When the switching office 10 receives the call setup request through the radio port 28, the switching office 10 confirms that the call setup request is performed through the idle channel 285 and then sends out call setup confirmation to the mobile terminal 51 through the radio port 28 and through the channel 285 to start the communication requested. Then, the switching office 10 renews the channel state memory 19 so that the current state of channel 285 becomes "busy" or "51 using", as shown in the figure.

In the figure, channel 286 is shown to be busy by mobile terminal 53 using.

The known communication system has disadvantages as described preamble.

Figure 2A:
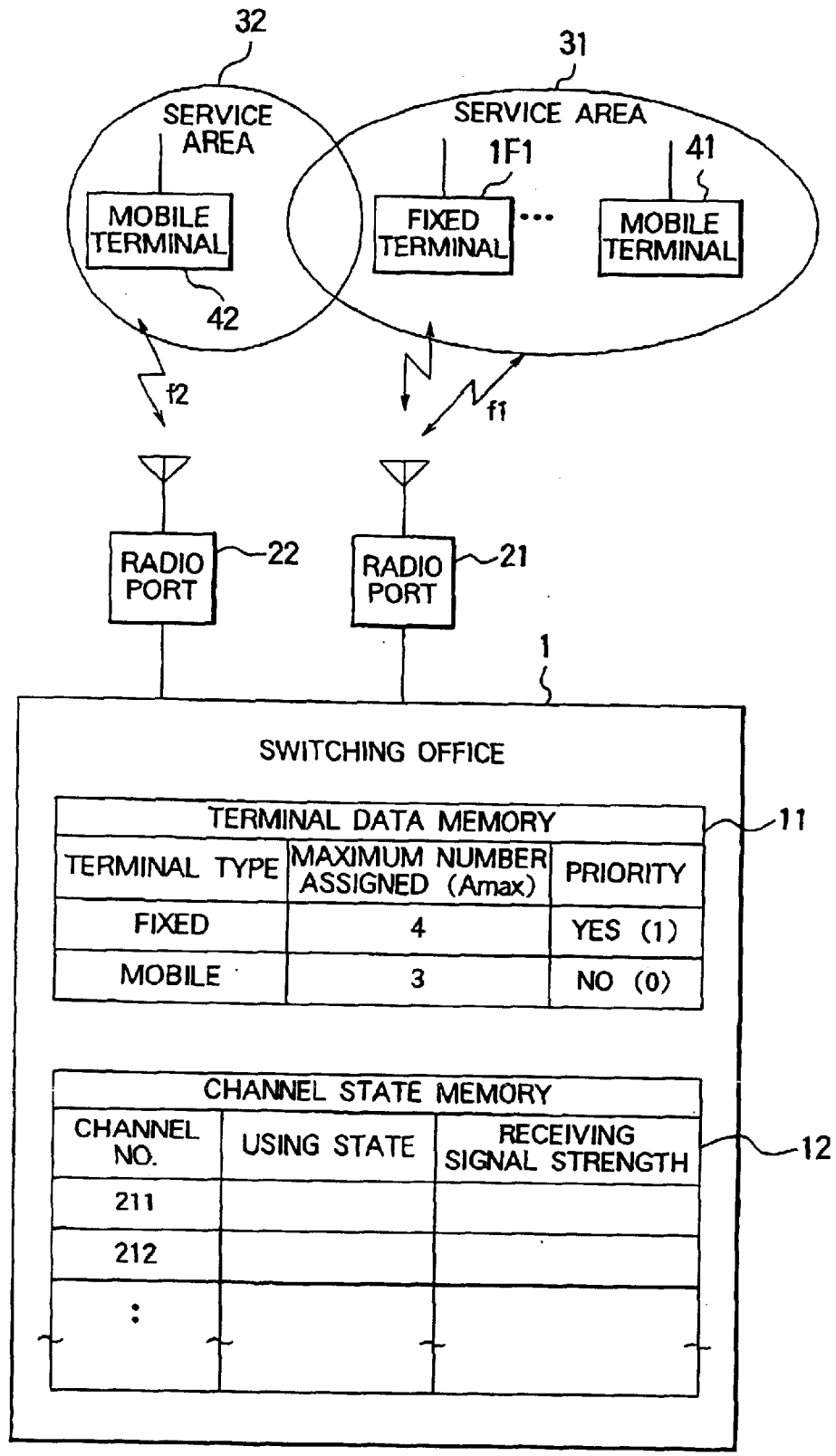
FIG. 2A is a schematic block diagram of a communication system according to an embodiment of this invention.

Now, referring to FIG. 2A, a communication system will be described according to an embodiment of this invention.

The communication system shown therein comprises a switching office 1, a plurality of radio ports (two ports 21 and 22 being shown) connected to the switching office 1 and having service areas 31 and 32, respectively, and a plurality of stationary or fixed terminals (one of which is shown at 1F1) and a plurality of mobile terminals (two of which are shown at 41 and 42) in each of the service areas 31 and 32. The fixed terminals 1F1 and mobile terminals 41 and 42 will be collectively referred to as radio terminals.

Each of radio ports 21 and 22 is for repeating between the switching office 1 and each of terminals in the corresponding service area. Different frequencies f1 and f2 are assigned for radio communication between the radio port 21 and radio terminals in the corresponding service area 31 and between the radio port 22 and radio terminals in the corresponding service area 32, respectively. A radio signal of each of frequencies f1 and f2 includes a plurality of channels which are separately used for communication of the radio port 21 or 22 with terminals in the corresponding service area 31 or 32.

The switching office 1 is provided with terminal data memories 11 corresponding to radio ports 21 and 22 for storing terminals in the service areas 31 and 32, respectively, and channel state memories 12 corresponding to the radio ports 21 and 22 for storing states of the channels on the frequencies f1 and f2 for the radio ports, respectively.

In the figure, one of the terminal data memories 11 is representatively shown for service area 31 and one of the channel state memories is representatively shown for the radio port 21 or the frequency f1, for the purpose of simplification of the drawings and description.

The terminal data memory 11 stores a table comprising a column (TERMINAL TYPE) for representing types of terminals, that is, fixed type and mobile type, another column (MAXIMUM NUMBER ASSIGNED (Amax)) for representing maximum numbers of channels assignable to those terminal types, respectively, and other column (PRIORITY) representing priority (YES (1)) or non-priority (NO (0)) of the terminal types.

The channel state memory 12 stores a table comprising a channel number column (CHANNEL NO.), another column (USING STATE) representing current state of the channels, that is, busy or idle, and terminals using the channels, and other column (RECEIVING SIGNAL STRENGTH) representing receiving signal strengths at terminals using the channels.

Figure 2B:
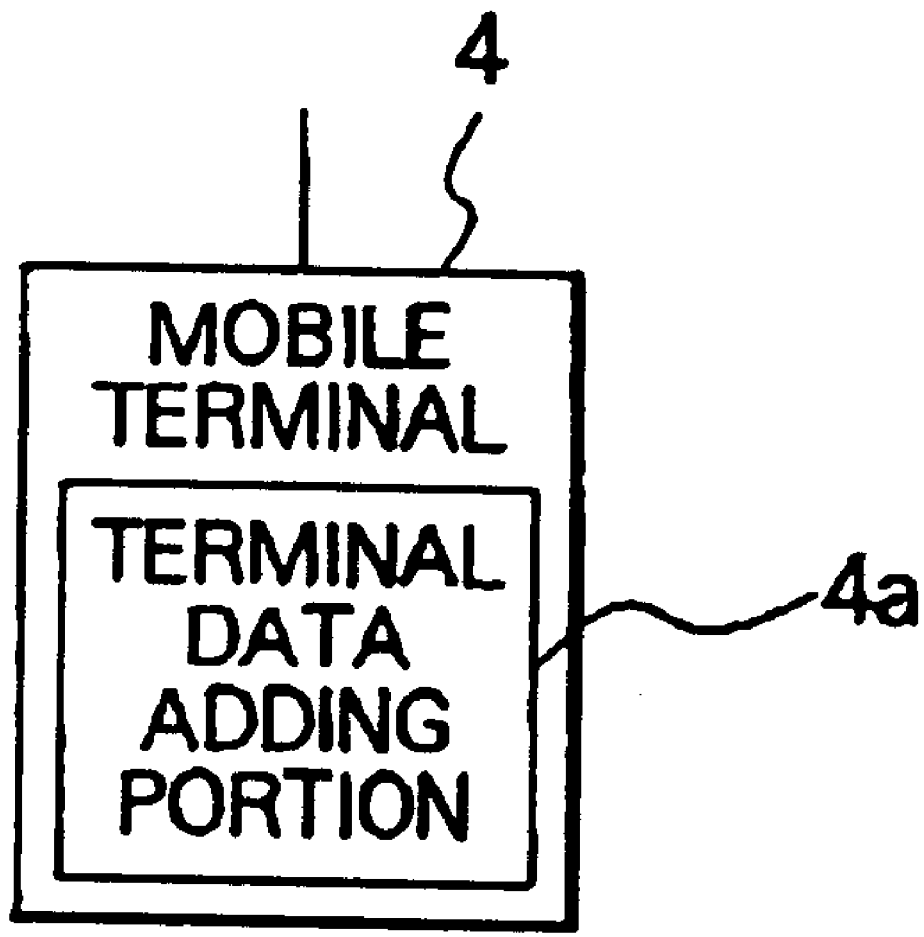
FIG. 2B is a schematic diagram of a terminal, in more detail, representative of the fixed and mobile terminals in FIG. 2A.

Each one of terminals 41, 42, 1F1, and others is shown at 4 in FIG. 2B and includes a terminal data adding portion 4a. The terminal data adding portion 4a is for discriminating broadcast from the switching office 1 through the radio port to determine one of channels assigned for originating call setup request and sends out terminal information including its own terminal number to the switching office 1. The terminal data adding portion 4a also selects one of channels for originating call setup request and sends out terminal information including its own terminal number together with the channel number selected as a selected channel number to the switching office. That is, the terminal data adding portion 4a serves as the receiving means and the calling means.

Figure 3:
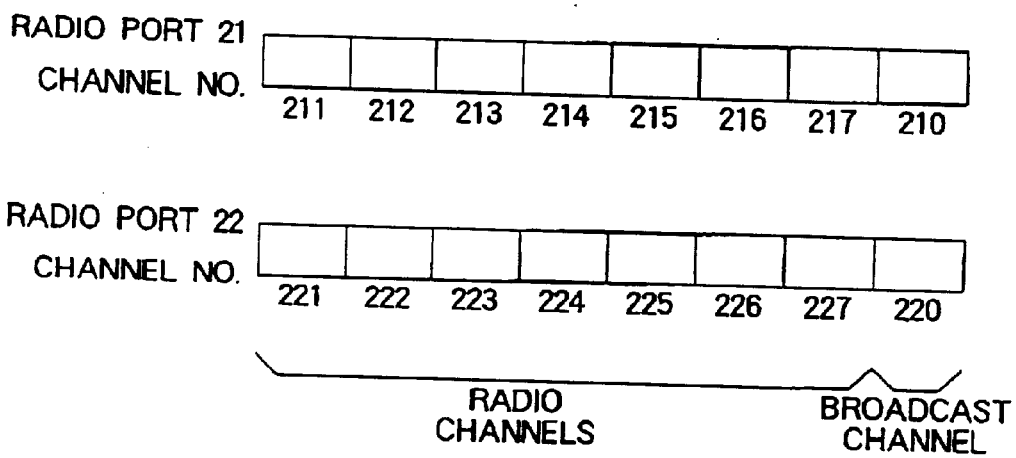
FIG. 3 illustrates channel formats on frequencies f1 and f2 for radio ports 21 and 22 in FIG. 2A.

Referring to FIG. 3, there is shown a channel format on a radio signal of the frequency f1 used between the radio port 21 and each of the terminals in the service area 31. The channel format comprises seven radio channels 211–217 usable at terminals and an broadcast channel 210. At the lower portion in the figure, there is also shown another channel format on the frequency f2 used between the radio port 22 and each of the terminals in the service area 32 and comprises seven radio channels 221–227 usable at terminals and an broadcast channel 220.

Figure 4:
FIG. 4 illustrates an example of contents in the channel state memory 12 in FIG. 2A.

Referring to FIG. 4, there is shown an example of content in the channel state memory 12, in which channel 211 is used by fixed terminal 1F1 with a receiving signal strength 10 dB, channel 212 by mobile terminal 41 with a receiving signal strength 12 dB, channel 213 by mobile terminal 43 with a receiving signal strength 10 dB, channel 214 by fixed terminal 1F2 with a receiving signal strength 8 dB, channel 215 by mobile terminal 47 with a receiving signal strength 4 dB, channel 216 being idle, and channel 217 being used by fixed terminal 1F3 with a receiving signal strength 10 dB.

Now, referring to FIG. 5, a channel assigning procedure will be described below in the communication system shown in FIGS. 2 and 3, in connection with, representatively, the terminals in the service area 31 through the radio port 21 with the frequency f1.

Assignment of Idle Channel

Exchange office 1 periodically broadcasts currently idle channel numbers as channel using state information to all terminals through the broadcast channel, as shown at step S1. When a particular one of terminals determines a particular idle channel from the channel using state information and sends out a call setup request including its own terminal type to the switching office 1 through the particular idle channel, the switching office 1 receives the call setup request as shown at step S2 and looks up the channel state memory 12 to determine, as a current number (N), a number of terminals which are of the same type as the particular terminal or the requesting terminal and currently use channels, as shown at step S3. Then, the switching office 1 looks up the terminal data memory 11 and compares the current number N with a maximum number Amax of the terminal type same as that of the particular terminal as shown at step S4.

1. Usual Assigning Procedure

At step S4, when N is smaller than Amax, the switching office 1 assigns the particular terminal to the particular idle channel which the particular terminal has used for sending out the call setup request and sends out call setup confirmation of the request to the particular terminal, as shown at step S5, thereafter, renewing the channel state memory so that the particular channel changes from the idle state into a busy state, as shown at step S6. Then, the switching office 1 carries out a procedure for starting the communication requested, as shown at step S7.

2. Priority Assigning Procedure

At step S4, when N is equal to or larger than Amax, the switching office 1 looks up the terminal data memory 11 and defines whether or not the type of the particular terminal is given the priority, at step S11. When the type of the particular terminal has the priority, the switching office 1 carries out steps S5–S7 as described above.

On the other hand, when the type of the particular terminal does not have the priority or has non-priority, the switching office rejects the call setup request from the particular terminal at step S12.

Change of Assignment to Priority Terminal

Now, referring to FIG. 6, a channel assignment procedure will be described during all of the channels are used.

The switching office 1 broadcasts busyness of all channels as the channel using state Information to all of the terminals through the broadcast channel at step S21. In the condition, a particular one of the terminals sends out a call setup request to the switching office through the broadcast channel. When the switching office 1 receives the call setup request from the particular terminal at step S22, it looks up the terminal data memory 11 and determines whether or not the particular or requesting terminal is the priority type, at step S23.

When the particular terminal is a priority type, the switching office 1 looks up the channel state memory 12 to determine a specific one of the non-priority type terminals which uses one of channels at the lowest or minimum receiving signal strength, as shown at step S25. Then, the switching office 1 instructs the terminal determined as the specific terminal to change a specific channel which the specific terminal currently uses into a different channel in another service area, as shown at step S26. This is because the specific terminal having the minimum receiving signal strength is considered to be most remote to the radio port 21 and is nearest another service area of another radio port 22 adjacent the service area of the radio port 21.

Thereafter, when the switching office 1 confirms that the specific terminal releases the specific channel at step S27, the switching office 1 assigns a released channel or the specific channel to the particular terminal or the requesting terminal at step S28 and sends out to the particular terminal call setup confirmation. Thereafter, the switching office 1 renews the channel state memory 12 so that the specific channel is changed from use by the specific terminal to use by the particular terminal, as shown at step S29. Then, the switching office 1 carries out communication start proceedings as the particular terminal requests.

When the particular terminal is determined as a non-priority terminal at step S23, the switching office 1 rejects the request from the particular terminal as shown at step S31.

Figure 7:
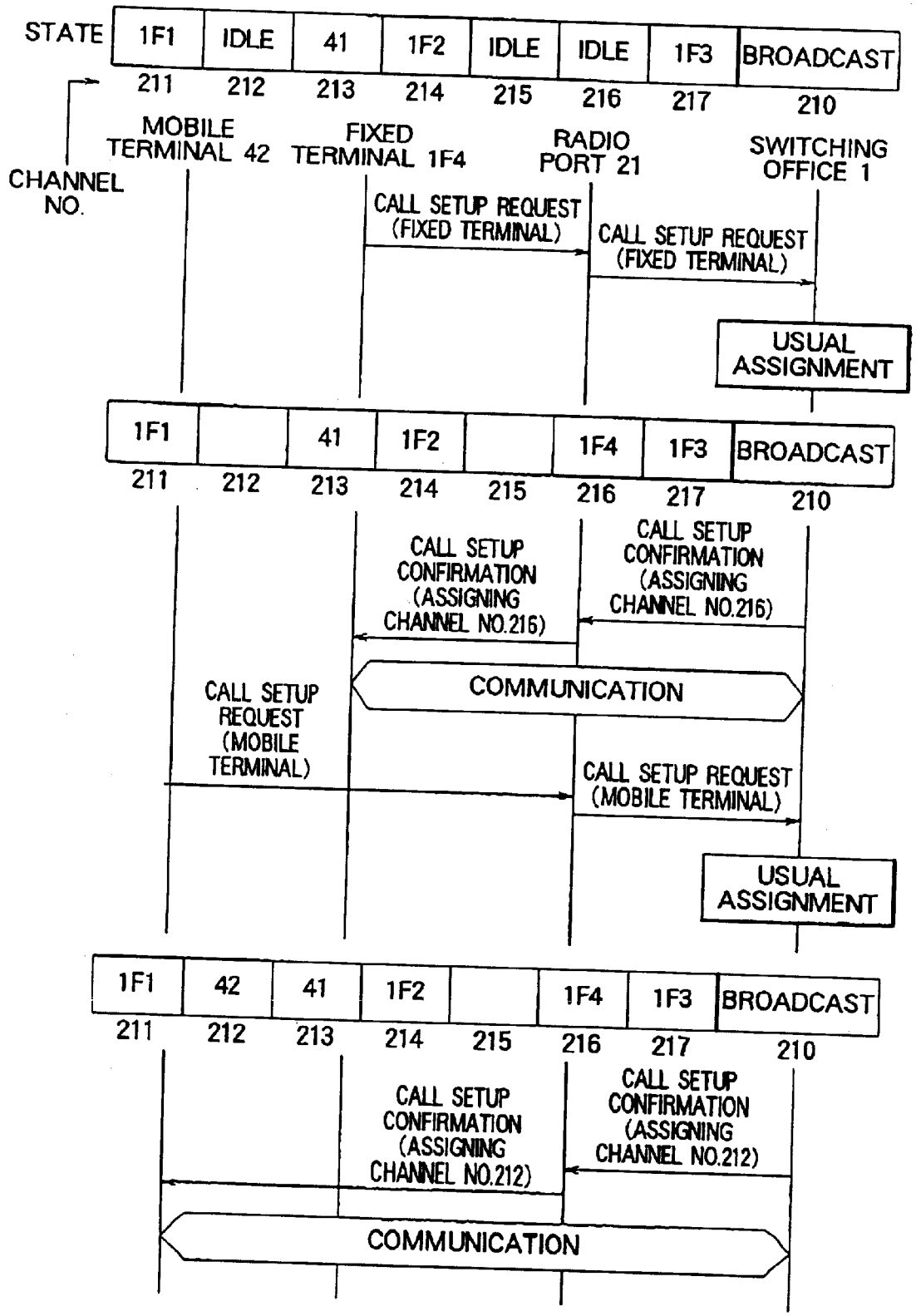
FIG. 7 is a flow chart illustrating an example according to the Usual Assigning Procedure of the Assignment of Idle Channel.

Referring to FIG. 7, description will be made below as regards an example of the Usual assigning Procedure of Assignment of Idle Channel.

In current channel using state in the channel state memory 12, channels 211, 213, 214, and 217 are used by fixed terminal 1F1, mobile terminal 41, fixed terminal 1F2, and fixed terminal 1F3, respectively, and channels 212, 215 and 216 are idle, as shown at the upper portion in the figure.

In the condition, when the fixed terminal 1F4, as the particular terminal, sends out a call setup request including its own terminal information through the channel 216 which is idle, the radio port 21 receives the call setup request and repeats it to the switching office 1, as shown at rightward arrows in the figure. The switching office 1 deals with the call setup request according to the Usual Assigning Procedure of the Assignment Idle Channel, as described above in connection with FIG. 5. Thus, the call setup confirmation is given to the fixed terminal 1F4 as shown at leftward arrows in the figure. Then, the fixed terminal 1F4 uses the channel 216 as shown at a middle portion in the figure and performs communication with the switching office 1, as shown by COMMUNICATION.

Then, the mobile terminal 42, as the particular terminal, sends out a call setup request including its own terminal information to the switching office 1 through an idle one 212 of channels, as shown rightward arrows below COMMUNICATION at the middle portion in the figure, the switching office 1 also carries out the Usual Assigning Procedure and sends out the call setup confirmation to the mobile terminal 42, as shown by leftward arrows at the lower portion in FIG. 7. Thus, the mobile terminal 212 uses the channel 212 and performs communication with the switching office 1.

Figure 5:
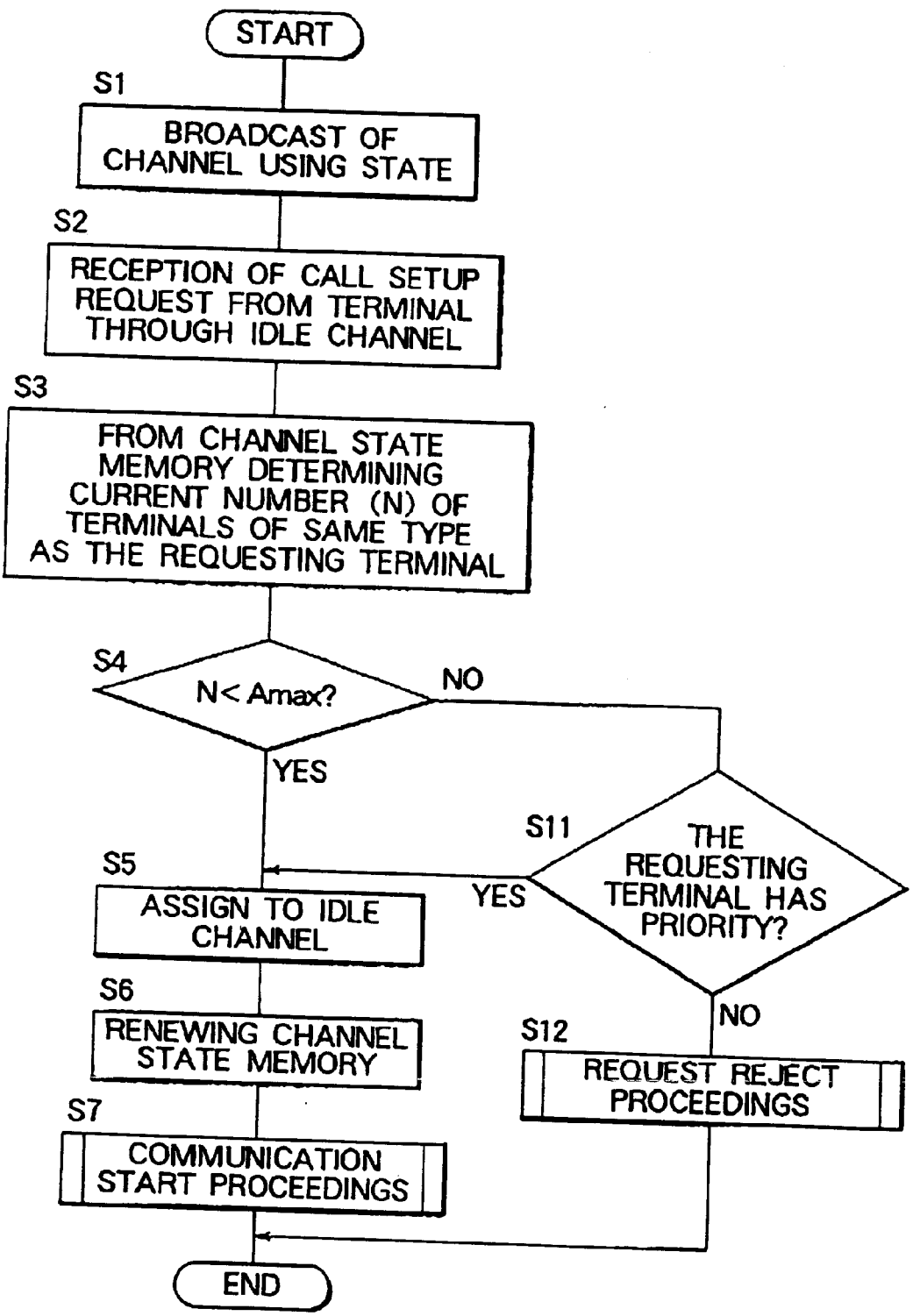
FIG. 5 illustrates an operation flow chart of the Assignment of Idle Channel in the switching office 1 in FIG. 2A.

If the maximum number (Amax) of mobile terminals currently uses channels, the call setup request by the mobile terminal 42 is rejected as shown at steps S11 and S12 in FIG. 5.

Now, description will be made as regards the Priority Assigning Procedure with reference to FIG. 8.

Figure 8:
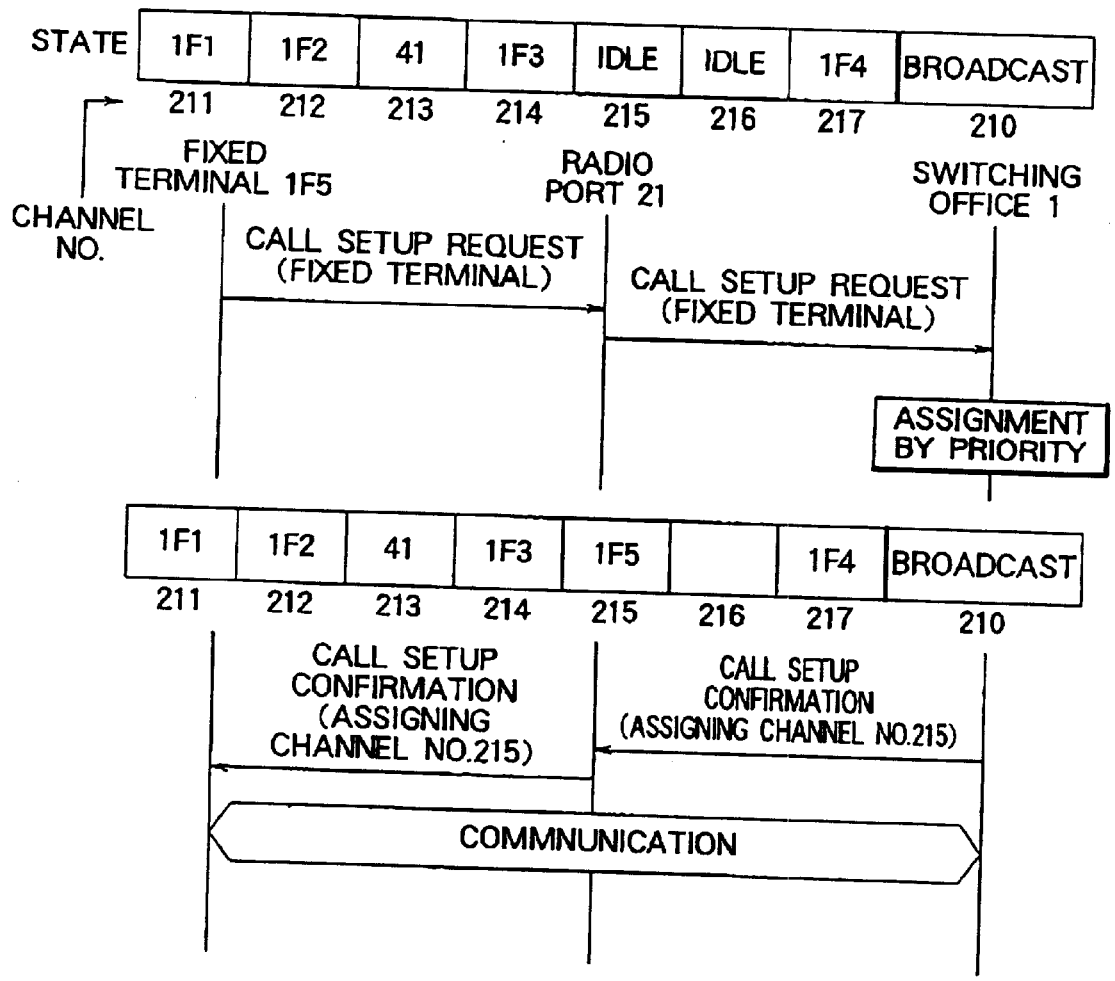
FIG. 8 is a flow chart illustrating an example according to the priority Assigning Procedure of the Assignment of Idle Channel.

Referring to FIG. 8, it is supposed that channels 211, 212, 213. 214, and 215 are currently used by fixed terminal 1F1, fixed terminal 1F2, mobile terminal 41, fixed terminal 1F3, and fixed terminal 1F4, respectively. Channels 215 and 216 are idle. This condition is stored in the channel state memory 12 in the switching office 1. In the terminal data memory 11 in the switching office 1, it is also supposed that the maximum number of the fixed terminals are 4 and fixed type terminal has the priority, as shown in FIG. 2.

In the condition, a fixed terminal 1F5, as the particular terminal, determines from the broadcast of channel using state information sent out from the switching office 1 that the channel 216 is idle, and sends out a call setup request including its own terminal information. The call setup request is passed through the radio port 21 to the switching office 1 as shown in leftward arrows in FIG. 8. The switching office 1 deal with the call setup request according to the Priority Assignment Procedure as described above in connection with FIG. 5, because N(=5)>Amax(=4) at step S4 in FIG. 5. The switching office 1 looks up the Priority column in the terminal data memory 11 and confirms that the fixed terminal 1F5 is a fixed type having the priority, at step S11 in FIG. 5. Then, the switching office 1 assigns the idle channel 215 to the fixed terminal 1F5 as shown at the middle portion in FIG. 8, and sends out call setup confirmation to the fixed terminal 1F5 through the radio port 21 as shown at leftward arrows in FIG. 8. At the time, the switching office 1 renews the channel state memory 12 so that the channel 215 becomes from the idle state to a busy state or use by fixed terminal 1F5. Thus, the fixed terminal 1F5 is brought into the communication with the switching office 1 as shown at bottom in FIG. 8.

In the example described above, the fixed type has the priority. However, it is possible that the mobile type is previously determined to have the priority, in place of the fixed type.

Now, referring to FIG. 9, description will be made as to an example according to the Change of Assignment to Priority Terminal as described in connection with FIG. 6.

It is provided that channels 211, 212, 213, 214, 215, 216 and 217 are currently used by fixed terminal 1F1 with a receiving signal strength 10 dB, mobile terminal 43 with a receiving signal strength 12 dB, mobile terminal 41 with a receiving signal strength 10 dB, fixed terminal 1F2 with a receiving signal strength 8 dB, mobile terminal 44 with a receiving signal strength 4 dB, fixed terminal 1F4 with a receiving signal strength 8 dB, and fixed terminal 1F3 with a receiving signal strength 10 dB. This condition is stored in the channel state memory 12 in the switching office 1.

Figure 9:
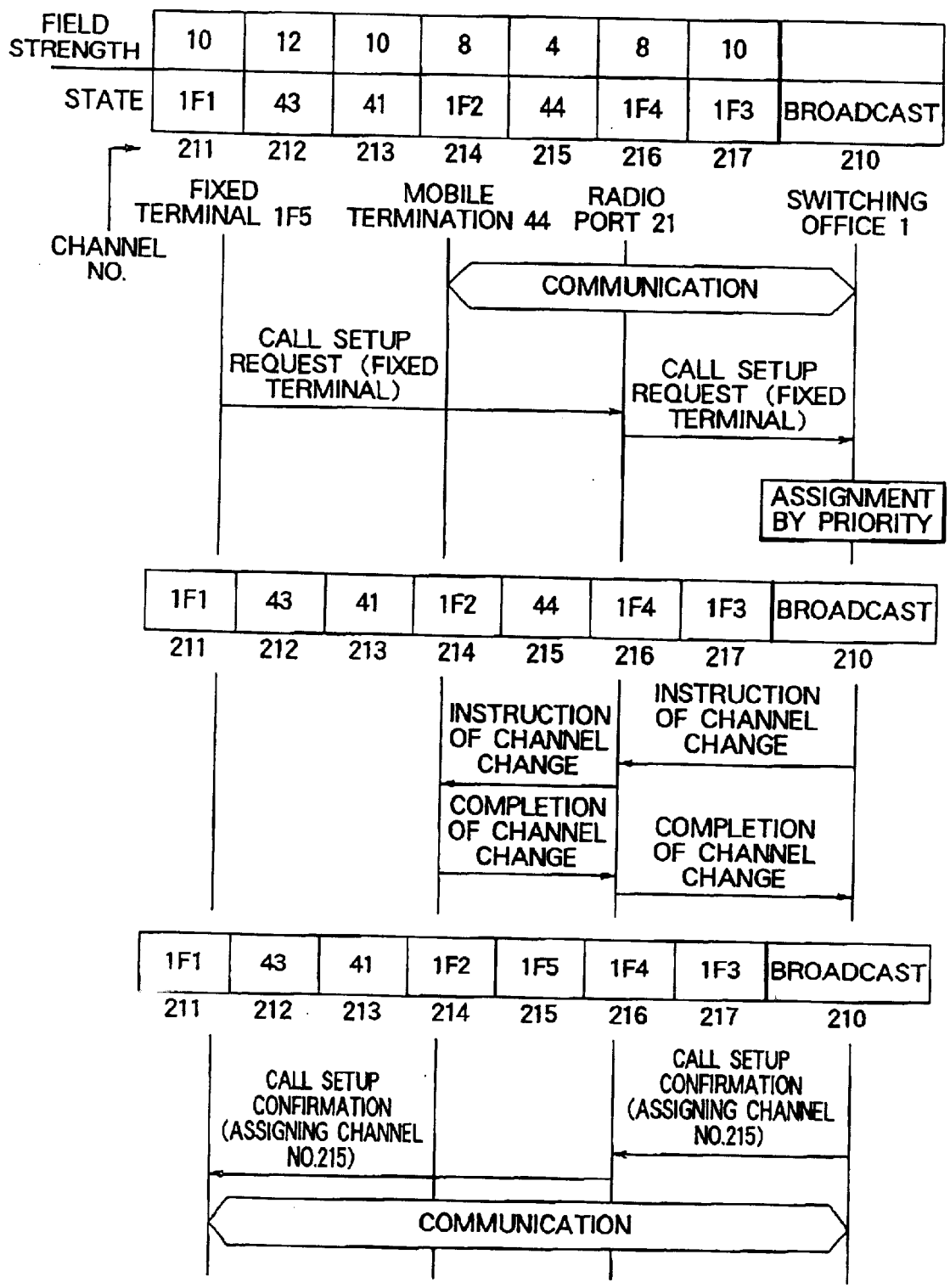
FIG. 9 is a flow chart illustrating an example according to a procedure of the Change of Assignment to Priority Terminal.

A fixed terminal 1F5, as the particular terminal, uses the broadcasting channel 210 to send out a call setup request including its own terminal information, which is passed through the radio port 21 to the switching office 1 as shown by rightward arrows in FIG. 9. The switching office 1 deals with the call setup request according to the Change of Assignment to Priority Terminal. Since the fixed terminal 1F5 is determined the priority type from the terminal data memory 11 (step S23 in FIG. 6), the switching office 1 looks the receiving signal strength column in channel state memory 12 (step S24 in FIG. 6), and determines, as the determined or the specific terminal one 44 of non-priority or mobile terminals which has the minimum or the lowest receiving signal strength (step S25 in FIG. 6). Then, the switching office 1 instructs the specific terminal 44 to change, as the specific channel, the channel 215 which the specific terminal uses into another channel in another service area 32 adjacent to the present service area 31, as shown by leftward arrows in FIG. 9 (step 26 in FIG. 6). Thereafter, the specific terminal 44 changes the channel and notices completion of channel change to the switching office 1 as shown rightward arrows in FIG. 9. When the switching office 1 confirms the completion of channel change (step S27 in FIG. 6), the switching office 1 assigns the specific channel 215 to the fixed terminal 1F5 and sends out the call setup confirmation to the particular terminal 1F5 as shown by leftward arrows at lower portion in the figure. Then the switching office 1 carries out the communication start proceedings as requested as well as renewing the channel state memory 12, according to steps S28–S30 in FIG. 6. Thus, the fixed terminal 1F5 carries out communication with switching office 1 as shown at bottom in FIG. 9.

In the condition where the all channels are used, the non-priority or the mobile terminal does not send out a call setup request. Even if it sends out the call setup request, the request is rejected at step S31 in FIG. 6.

In the above example, the fixed type is previously determined as the priority type. However, it is possible to determine the mobile type as the priority type, in place of the fixed type.

Next, referring to FIG. 10, description will be made as to a modification where terminals perform steps S3–S5 in FIG. 5.

In the modification, the switching office 1 broadcasts, as system information, the data in the terminal data memory 11 and the channel state memory 12 to all of the terminals in the service area 31 through the broadcast channel 210, at step S1 in FIG. 5.

In an example, it is provided that the channels 211, 213, 214, and 217 are used by fixed terminal 1F1, mobile terminal 41, fixed terminal 214, and fixed terminal 1F3, respectively. Channels 212, 215 and 216 are idle.

From the system information, one terminal 1F4 of fixed terminals, as a particular terminal, determines a current number (N) of terminals of the fixed type same as its own type which currently use channels, and compares the current number N with the maximum number Amax of the fixed type (similar to steps S3 and S4 in FIG. 5). When N is smaller than Amax, the particular terminal 1F4 selects one 216 of idle channels as a particular channel assigned itself (similar to step S5 in FIG. 5).

Figure 10:
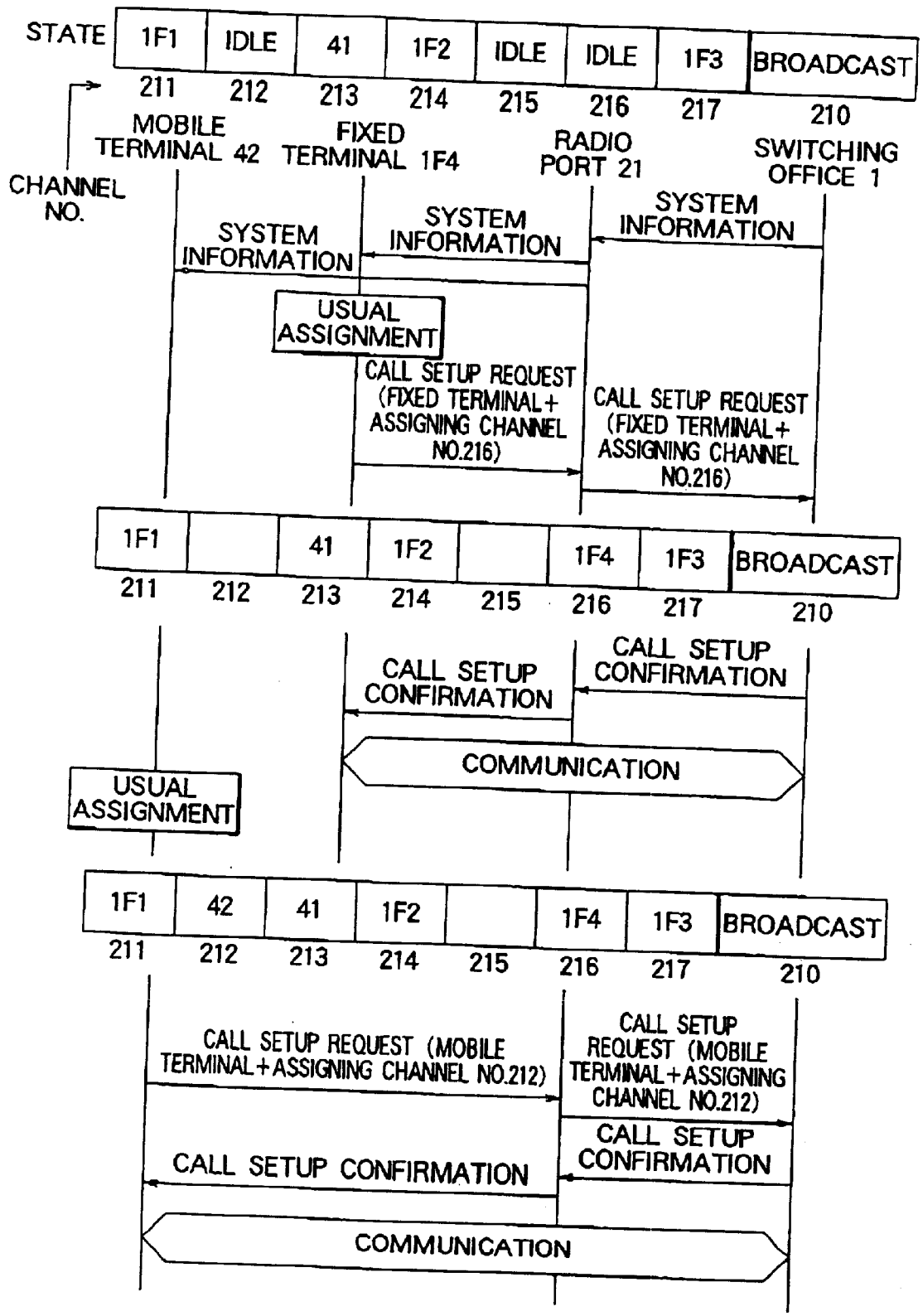
FIG. 10 is a flow chart illustrating an example according to the Usual Assigning Procedure of the Assignment of Idle Channel which is carried out in the calling terminal.

Then, the particular terminal 1F4 sends out a call setup request including its own terminal information together with the particular channel number 216 to the switching office 1 through the radio port 21, as shown by rightward arrows in FIG. 10.

When the switching office 1 receives the call setup request, the switching office 1 renews the channel state memory 12 and sends out the call setup confirmation to the particular terminal at step S6 in FIG. 5. Thus, the channel 216 becomes busy by use of the fixed terminal 1F4 from an idle condition. Then, the switching office 1 starts the communication start proceedings. Thus, the fixed terminal 1F4 is brought into communication with the switching office 1 as shown at middle portion in FIG. 10, according to the Usual Assigning Procedure.

When one terminal 42 of mobile terminals, as the particular terminal, sends out a call setup request including its own terminal information together with a channel number 212 which is selected as a particular channel in the similar manner on the base of the system information, the switching office 1 receives and deals with the call setup request and renews the channel state memory 12 so that the channel 212 changes from an idle condition to use by the mobile terminal 42, while sending out the call setup confirmation to the particular terminal 42 as shown by leftward arrows at lower portion in FIG. 10. Thus, the mobile terminal 42 carries out communication with the switching office 1 as shown at bottom in FIG. 10.

Now, referring to FIG. 11, description will be made as regards another modification where the Priority Assigning Procedure (steps S3–S4–S11–S5) is performed in terminals. In the modification, switching office 1 is broadcasting the system information to all the terminals in the similar manner as in the modification of FIG. 10.

In an example, it is provided that channels 211, 212, 213, 214, and 217 are currently used by fixed terminal 1F1, fixed terminal 1F2, mobile terminal 41, fixed terminal 1F3, and fixed terminal 1F4, respectively.

Figure 11:
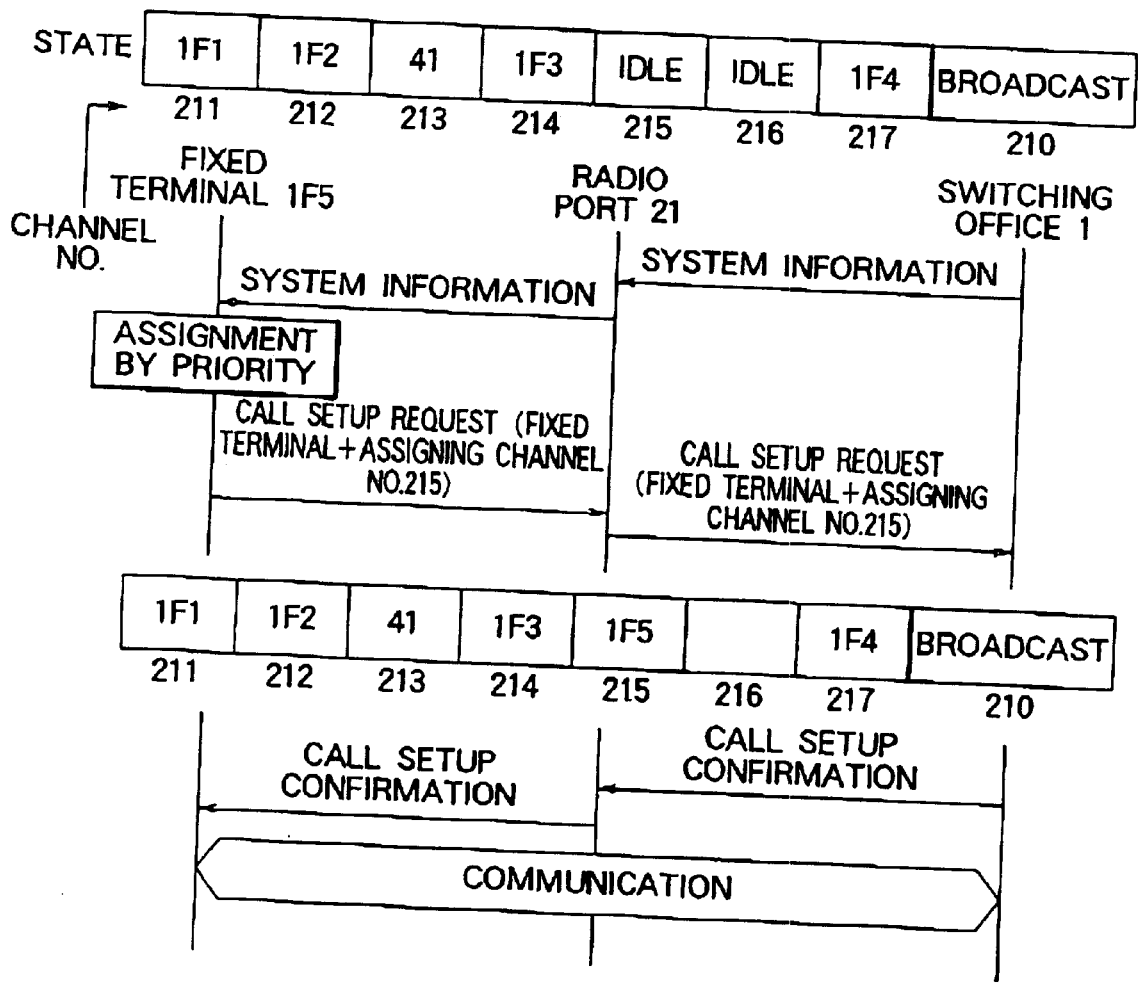
FIG. 11 is a flow chart illustrating an example according to the priority Assigning Procedure of the Assignment of Idle Channel which is carried out in the calling terminal.

From the system information broadcast from switching office 1 as shown by leftward arrows in FIG. 11, one terminal 1F5 of the fixed terminals, as a particular terminal, determines a current number (N) of terminals of the fixed type same as its own type which currently use channels, and compares the current number N with the maximum number Amax of the fixed type (similar to steps S3 and S4 in FIG. 5). Even when N is equal to or larger than Amax, the particular terminal 1F5 selects one 215 of idle channels as a particular channel assigned itself, after the particular terminal 1F5 confirms from the system information that the fixed type has the priority (similar to steps S11–S5 in FIG. 5). Then, the fixed terminal 1F5 sends out a call setup request including the its own terminal information together with the particular channel number 215 to the switching office 1, as shown by rightward arrows in FIG. 11.

Thereafter, the switching office 1 deals with the request in the similar manner as in FIG. 10, to renew the channel state memory 12 and starting the communication start proceedings. Thus, the fixed terminal 1F5 can perform the communication with the switching office 1 by use of the channel 215 as shown at bottom in FIG. 11.

Further, referring to FIG. 12, description will be made as regards a further modification where terminals perform steps S23–S24–S25 in the Change of Assignment to Priority Terminal in FIG. 6.

Figure 12:
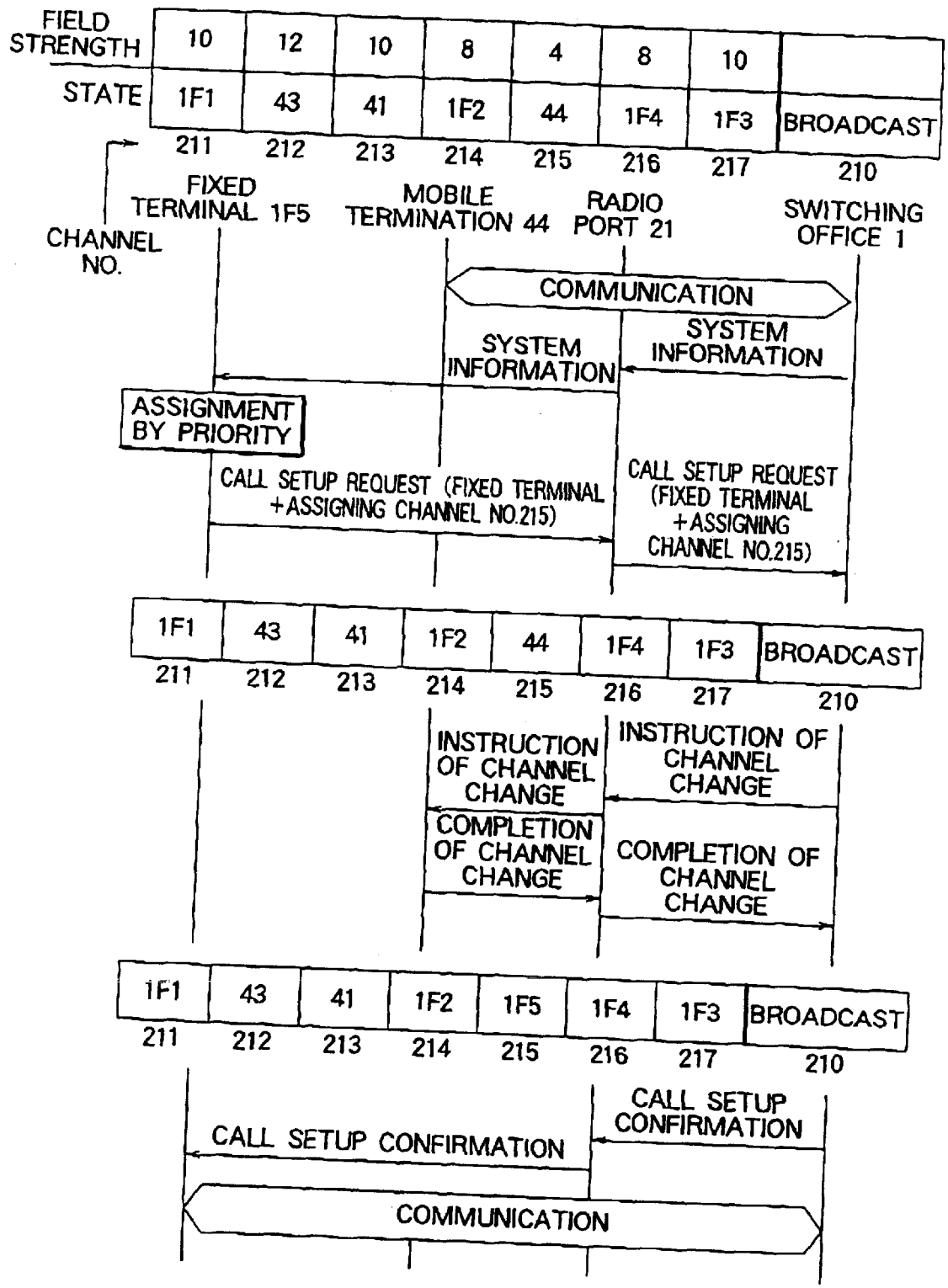
FIG. 12 is a flow chart illustrating an example according to a procedure of the Change of Assignment to Priority Terminal which is carried out in the calling terminal.

Referring to FIG. 12, it is supposed that all channels 211, 212, 213, 214, 215, 216 and 217 are currently used by fixed terminal 1F1 with a receiving signal strength 10 dB, mobile terminal 43 with a receiving signal strength 12 dB, mobile terminal 41 with a receiving signal strength 10 dB, fixed terminal 1F2 with a receiving signal strength 8 dB, mobile terminal 44 with a receiving signal strength 4 dB, fixed terminal 1F4 with a receiving signal strength 8 dB, and fixed terminal 1F3 with a receiving signal strength 10 dB, respectively, as shown at upper portion in FIG. 12. This condition is also stored in the channel state memory 12 in the switching office 1.

The switching office 1 broadcasts, as system information, the data in the terminal data memory 11 and the channel state memory 12 to all of the terminals in the service area 31 through the broadcast channel 210, at step S1 in FIG. 5, and as shown by leftward arrows in FIG. 12.

Figure 6:
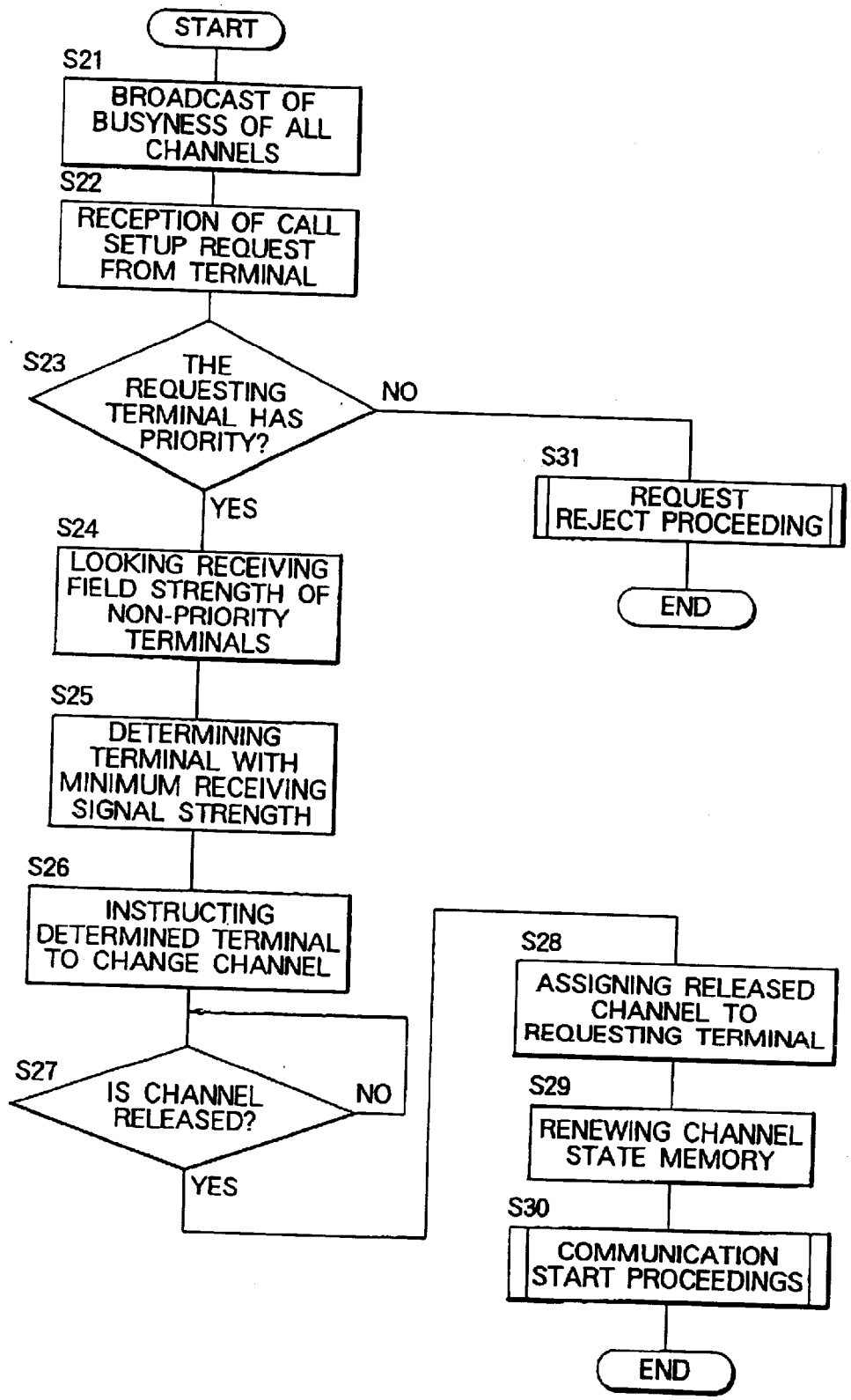
FIG. 6 illustrates an operation flow chart of the Change of Assignment to Priority Terminal in the switching office 1 in FIG. 2A.

From the system information broadcast from switching office 1, one terminal 1F5 of the fixed terminals, as a particular terminal, confirms to be the priority type from the content in the terminal data memory 11 (step S23 in FIG. 6), and determines, as the determined or the specific terminal, one terminal 44 of non-priority or mobile terminals which has the minimum or the lowest receiving signal strength (step S25 in FIG. 6). Then, the fixed terminal 1F5 selects and assigns thereto with, as a particular channel, the channel 215 which the specific terminal currently uses. Then, the fixed terminal 1F5 sends out a call setup request including the its own terminal information together with the particular channel number 215 to the switching office 1, as shown by rightward arrows in FIG. 12.

When the switching office 1 receives the call setup request from the particular terminal 1F5 and instructs the specific terminal 44 to change the particular channel 215 into another channel in another service area 32 adjacent to the present service area 31, as shown by leftward arrows in FIG. 12 (step 26 in FIG. 6). Thereafter, the specific terminal 44 changes the channel and notices completion of channel change to the switching office 1 as shown rightward arrows in FIG. 12. When the switching office 1 confirms the completion of channel change (step S27 in FIG. 6), the switching office 1 sends out the call setup confirmation to the particular terminal 1F5 (step S28) and renews the channel state memory 12 (step S29), then, starting the communication start proceedings (step S30). Thus, the fixed terminal 1F5 can perform the communication with the switching office 1 as shown at bottom in FIG. 12.

In the above example, the fixed type is previously determined as the priority type. However, it is possible to determine the mobile type as the priority type, in place of the fixed type.

A data processor can be used for performing the procedures shown in FIGS. 5 and 6 in the switching office 1, although the processor itself is not shown in FIG. 2. The terminal adding portion 4a is also realized by a data processor for performing the channel assignment procedures as described above.

Further, it is needless to say that each of terminals and each of radio ports have transmitters and receivers for transmitting and receiving radio signals and modulators and demodulators for carrying or extracting data signals onto or from a radio carrier wave, although they are not shown in the drawing.

What is claimed is:

1. A communication system comprising a switching office and a service area including therein terminals of a fixed and a mobile type selectively communicating with the switching office through a plurality of radio channels,
   each of said terminals having means for producing a call setup request including its own terminal information to send out, as a particular terminal, said call setup request being transmitted to said switching office,
   said switching office comprising:
      channel state memory means for storing information as to whether said radio channels are currently idle or busy and which ones of said fixed and mobile terminals currently use the busy channels; and
      channel assigning means responsive to said call setup request for looking up said channel state memory means to assign one of said idle channels to said particular terminal, while renewing said channel state memory means, wherein any one of said idle channels is assignable to said particular terminal of said fixed and said mobile terminals.

2. A communication system comprising a switching office and a service area including therein terminals of a fixed and a mobile type selectively communicating with the switching office through a plurality of radio channels,
   each of said terminals having means for producing a call setup request including its own terminal information to send out, as a particular terminal, said call setup request being transmitted to said switching office,
   said switching office comprising:
      channel state memory means for storing information as to whether said radio channels are currently idle or busy and which ones of said fixed and mobile terminals currently use the busy channels; and
      channel assigning means responsive to said call setup request for looking said channel state memory means to assign one of said idle channels to said particular terminal, while renewing said channel state memory means; wherein
   said terminal information includes type information representing, as a particular type, said particular terminal itself, and
   said switching office further comprises:
      terminal data memory means for storing the maximum number separately predetermined for each of said fixed and mobile types of said terminals assignable to said plurality of radio channels;
      said channel assigning means looking said terminal data memory means and said channel state memory means to compare the maximum number of the type corresponding to said particular type and the current number of terminals of the type corresponding to said particular type currently using the busy channels, said channel assigning means assigning one of current idle channels to said particular terminal when said maximum number is larger than said current number.

3. A communication system as claimed in claim 2, wherein
   said terminal data memory means further stores priority information that a predetermined one of said fixed type and said mobile type is a priority type while the other being a non-priority type; and said channel assigning means assigns one of the current idle channels to said particular terminal when said particular type is the priority type, even when said current number is equal to or larger than said maximum number.

4. A communication system as claimed in claim 3, wherein said channel state memory means further stores receiving signal strengths at terminals using the busy channels;

said channel assigning means is responsive to said call setup request including said priority type as said particular type when said all channels are currently busy, for looking said channel state memory means to find out, as a specific terminal, one of terminals of said non-priority type currently using, as a specific channel, one of channels with the lowest one of said receiving signal strengths, said channel assigning means instructing said specific terminal to release said specific channel and assigning said specific channel to said particular channel after said specific terminal completes the release of said specific channel.

5. A communication system comprising a switching office and a service area including therein terminals of a fixed and a mobile type selectively communicating with the switching office through a plurality of radio channels, each of said terminals comprising:

receiving means for receiving a system information broadcast from said switching office through a radio control channel, said system information comprising channel state information whether said radio channels are currently idle or busy and which ones of said fixed and mobile terminals currently use the busy channels; and calling means for referring to said channel state information to select, as a particular channel, one of the idle channels, said calling means producing a call setup request including its own terminal information together with said particular channel to send out, as a particular terminal, said call setup request being transmitted to said switching office, said switching office comprising:

channel state memory means for storing said channel state information;

broadcasting means for broadcasting said system information through said radio control channel; and channel assigning means responsive to said call setup request for assigning said particular channel to said particular terminal to renew said channel state memory means, wherein any of said idle channels is assignable to said particular terminal of said fixed and said mobile terminals.

6. A communication system comprising a switching office and a service area including therein terminals of a fixed and a mobile type selectively communicating with the switching office through a plurality of radio channels, each of said terminals comprising:

receiving means for receiving a system information broadcast from said switching office through a radio control channel, said system information comprising channel state information whether said radio channels are currently idle or busy and which ones of said fixed and mobile terminals currently use the busy channels; and calling means for referring to said channel state information to select, as a particular channel, one of the idle channels, said calling means producing a call setup request including its own terminal information together with said particular channel to send out, as a particular terminal, said call setup request being transmitted to said switching office, said switching office comprising:

channel state memory means for storing said channel state information;

broadcasting means for broadcasting said system information through said radio control channel; and channel assigning means responsive to said call setup request for assigning said particular channel to said particular terminal to renew said channel state memory means; wherein said system information further comprises terminal data of the maximum number separately predetermined for each of said fixed and mobile types of said terminals assignable to said plurality of radio channels;

said calling means referring to said terminal data and said channel state information to compare the maximum number of the type corresponding to its own terminal type as a particular type with the current number of terminals of the type corresponding to said particular type currently using the busy channels, said calling means selecting, as said particular channel, one of current idle channels when said maximum number is larger than said current number; and said switching office further comprises terminal data memory means for storing said terminal data.

7. A communication system as claimed in claim 6, wherein said terminal data further comprises priority data that a predetermined one of said fixed type and said mobile type is a priority type while the other being a non-priority type;

said calling means selects; as said particular channel, one of the current idle channels when said particular type is the priority type, even when said current number is equal to or larger than said maximum number.

8. A communication system as claimed in claim 7, wherein said channel state information further comprises receiving signal strengths at terminals using the busy channels;

said calling means is responsive to said priority type of said particular type when said all channels are currently busy, and refers to said channel state information to find out, as a specific terminal, one of terminals of said non-priority type currently using, as a specific channel, one of channels with the lowest one of said receiving signal strengths, said calling means selecting said specific channel as said particular channel;

said channel assigning means is responsive to said call setup request to instruct said specific terminal to release said particular channel, and assigns said particular channel to said particular channel after said specific terminal completes the release of said particular channel.

* * * * *